US008054168B2

(12) United States Patent
McCormick et al.

(10) Patent No.: US 8,054,168 B2
(45) Date of Patent: Nov. 8, 2011

(54) SYSTEM AND METHOD FOR ESTIMATING AN EMERGENCY LEVEL OF A VEHICULAR ACCIDENT

(75) Inventors: Catherine L. McCormick, West Bloomfield, MI (US); Steven C. Tengler, Grosse Pointe Park, MI (US)

(73) Assignee: General Motors LLC, Detroit, MI (US)

( * ) Notice: Subject to any disclaimer, the term of this patent is extended or adjusted under 35 U.S.C. 154(b) by 308 days.

(21) Appl. No.: 12/395,568

(22) Filed: Feb. 27, 2009

(65) Prior Publication Data

US 2010/0219944 A1 Sep. 2, 2010

(51) Int. Cl.
*B60C 23/00* (2006.01)

(52) U.S. Cl. ........................... 340/436; 340/438; 701/35

(58) Field of Classification Search .................. 340/436, 340/438, 435, 441, 471, 933, 937; 701/35, 701/213, 300, 301, 302; 348/148, 149
See application file for complete search history.

(56) References Cited

U.S. PATENT DOCUMENTS

| | | | | |
|---|---|---|---|---|
| 6,141,611 | A | 10/2000 | Mackey et al. | |
| 6,246,933 | B1 | 6/2001 | Bague | |
| 6,580,373 | B1 | 6/2003 | Ohashi | |
| 6,593,848 | B1 | 7/2003 | Atkins, III | |
| 6,950,013 | B2 * | 9/2005 | Scaman et al. | 340/436 |
| 6,982,625 | B2 * | 1/2006 | Chainer et al. | 340/3.3 |
| 7,254,482 | B2 * | 8/2007 | Kawasaki et al. | 701/211 |
| 7,323,969 | B1 | 1/2008 | Delgado et al. | |
| 7,378,949 | B2 | 5/2008 | Chen | |
| 7,386,376 | B2 | 6/2008 | Basir et al. | |
| 7,680,680 | B2 * | 3/2010 | Wahlbin et al. | 705/4 |
| 2005/0185052 | A1 * | 8/2005 | Raisinghani et al. | 348/148 |
| 2008/0111666 | A1 * | 5/2008 | Plante et al. | 340/425.5 |
| 2008/0239077 | A1 | 10/2008 | Kurylo | |
| 2009/0157255 | A1 * | 6/2009 | Plante | 701/35 |
| 2010/0131304 | A1 * | 5/2010 | Collopy et al. | 705/4 |

* cited by examiner

*Primary Examiner* — Toan N Pham
(74) *Attorney, Agent, or Firm* — Dierker & Associates, P.C.

(57) ABSTRACT

A method for estimating an emergency level of a vehicular accident includes detecting an event associated with the vehicular accident, initiating a video recording of an interior and/or exterior of the vehicle in response to the detecting of the event, uploading the video recording on a remotely accessible page, and reviewing the uploaded video recording to estimate the emergency level of the vehicular accident. Also disclosed herein is a system for accomplishing the same.

19 Claims, 2 Drawing Sheets

SYSTEM AND METHOD FOR ESTIMATING AN EMERGENCY LEVEL OF A VEHICULAR ACCIDENT

TECHNICAL FIELD

The present disclosure relates generally to systems and methods for estimating an emergency level of a vehicular accident.

BACKGROUND

Vehicular accidents are a common occurrence in modern day travel, and some may be more serious than others. In response to more serious accidents, emergency personnel are often dispatched to the accident scene to provide medical attention or other assistance to injured occupant(s) of the vehicle(s) involved. In many instances, the emergency personnel have limited knowledge, if any at all, of the severity of the accident, including the extent of injury to the vehicle occupants and/or the extent of injury to the vehicle, prior to arriving at the accident scene.

SUMMARY

A method for estimating an emergency level of a vehicular accident is disclosed herein. The method includes detecting an event associated with the vehicular accident and initiating a video recording of at least one of an interior of a vehicle or an exterior of the vehicle in response to the detecting of the event. The method further includes uploading the video recording on a remotely accessible page and reviewing the uploaded video recording to estimate the emergency level of the vehicular accident. A system for estimating an emergency level of a vehicular accident is also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the method and system disclosed herein may advantageously be used to determine an emergency level of a vehicular accident. The determined emergency level may be used to assess i) a number of occupants in a vehicle involved in the accident, ii) a severity of injuries sustained by the occupant(s), iii) a severity of damage sustained to the vehicle involved in the accident, and/or the like. Such information may, in some instances, advantageously be used to achieve a faster response time on behalf of emergency personnel dispatched to the accident scene. Furthermore, such information may potentially enable the emergency personnel to provide tailored assistance for on-site treatment of injured vehicle occupants.

It is to be understood that, as used herein, the term "user" includes vehicle owners, operators, and/or passengers. It is to be further understood that the term "user" may be used interchangeably with subscriber/service subscriber.

As also used herein, a "vehicular accident" refers to an event causing damage to a vehicle and/or one or more injuries to one or more vehicle occupants. The term "vehicular accident" may be used interchangeably with the term "vehicle crash." Furthermore, a "vehicle occupant" refers to a person or an animal located inside the vehicle during the vehicular accident. The vehicle occupants may include, for example, a vehicle driver and/or a vehicle passenger.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

Figure 1:
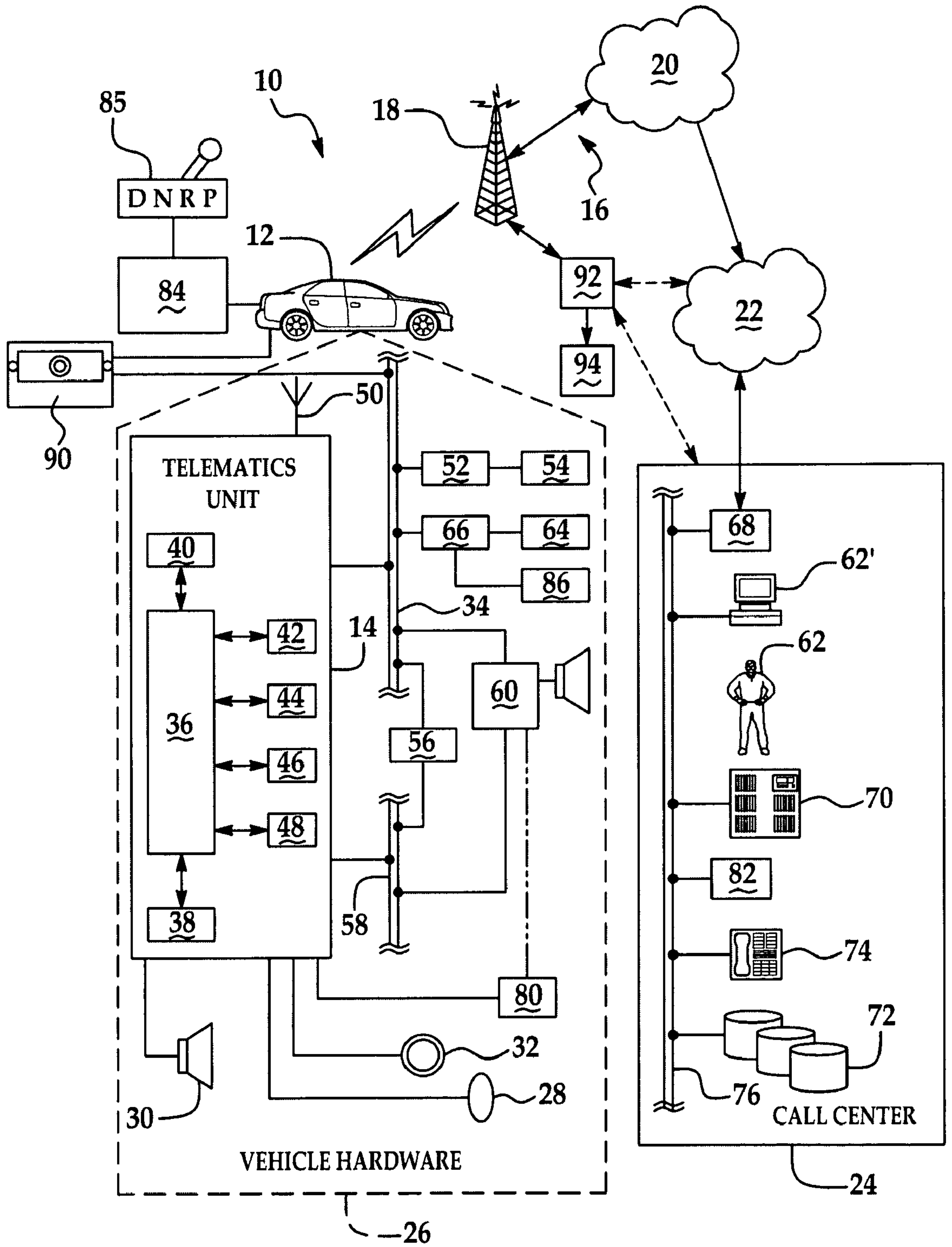
FIG. 1 is a schematic diagram depicting an example of a system for estimating an emergency level of a vehicular accident.

Referring now to FIG. 1, the system 10 includes a vehicle 12, a telematics unit 14, a wireless carrier/communication system 16 (including, but not limited to, one or more cell towers 18, one or more base stations and/or mobile switching centers (MSCs) 20, and one or more service providers (not shown)), one or more land networks 22, and one or more call centers 24. In an example, the wireless carrier/communication system 16 is a two-way radio frequency communication system. In another example, the wireless carrier/communication system 16 includes one or more servers 92 operatively connected to a remotely accessible page 94 (e.g., a webpage).

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

The vehicle 12 also includes several internal operation systems including, for example, a transmission system 84. The transmission system 84 may be an automatic transmission system or a manual transmission system. In either case, the operating mode of the transmission system 84 may be controlled by a gearshift 85. In the example shown in FIG. 1, the vehicle driver may use the gearshift 85 to adjust the transmission system 84 (whether manual or automatic) between a park mode (denoted "P"), a reverse mode (denoted "R"), a neutral mode (denoted "N"), one or more drive modes (denoted "D"), and/or the like. It is to be understood that in a manual transmission, the gearshift 85 is used in combination with a clutch for switching modes and for regulating torque transfer from the engine (not shown) to the transmission system 84.

The vehicle 12 further includes a video recording device 90 operatively connected thereto. The video recording device 90 is also in operative and selective communication with at least one crash and or collision sensor 54, for example, via a bus 34 (described further hereinbelow). In an example, the sensor(s) 54 may be distributed throughout the vehicle 12.

The video recording device 90 is generally configured to produce a video recording of an interior of the vehicle 12 and/or an exterior of the vehicle 12 in response to detecting an event, where the detecting may be accomplished via the sensor(s) 54. The video recording may include or enable the extraction of data related to, for example, i) injuries to one or more occupants of the vehicle 12, ii) a number of occupants in the vehicle 12, iii) an approximate age of each of the occupants in the vehicle 12, and iv) an impact to the vehicle 12.

As used herein, an "event" refers to an action upon or within the vehicle 12 that triggers a response by emergency personnel. Non-limiting examples of events include detection of a sudden reduction in speed (or deceleration) of the vehicle 12, detection of an impact by another vehicle or object, actuation of an emergency button, initiation of an emergency call or other similar telecommunication with a call center 24 and/or an emergency help line (e.g., 911, a local police or fire department, a hospital, etc.), and/or the like, and/or combinations thereof.

In some instances, the vehicle 12 may include a single video recording device 90. In an example, the single recording device 90 is a rotatable camera, such as a reverse parking aid camera, operatively disposed in or on the vehicle 12. In instances where the reverse parking aid camera is used, the camera may be located proximate a rear side of the vehicle 12. In other instances, the vehicle 12 may include more than one video recording device 90. In an example, the video recording devices 90 may include multiple rotatable cameras disposed at predetermined positions in and/or on the vehicle 12.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. For example, the telematics unit 14 may be configured to transmit a video recording obtained from the video recording device(s) 90 to the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be a short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions and, according to the example shown here, generally includes one or more switches 68, servers 70, databases 72, live and/or automated advisors 62, 62', as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The call center 24 is also configured to i) receive a video recording from the telematics unit 14 in response to an event, and ii) upload at least a portion of the video recording to the remotely accessible page 94. The call center 24, via the live or automated advisor 62, 62', is further configured to notify emergency personnel of the uploaded video recording so that the emergency personnel can estimate an emergency level of the vehicular accident. Further details of the method of estimating the emergency level will be described hereinbelow in conjunction with FIG. 2.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

A cellular service provider generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

Examples of the method of estimating an emergency level of a vehicular accident is described hereinbelow with reference to FIG. 2. In these examples, one or more video recording devices 90 are used to record video data related to a vehicular accident and in response to some event. In some instances, the method uses a single video recording device 90 such as, e.g., a reverse parking aid camera. The reverse parking aid camera performs two functions: i) to assist the vehicle driver when he/she is operating the vehicle 12 in a reverse mode, and ii) to record the video data related to the event when he/she is operating the vehicle 12 in a drive mode and an event is detected. In such instances, when the vehicle operator shifts the transmission system 84 into the reverse mode, via the gearshift 85, the camera adjusts its positioning to view an area external to the vehicle 12 at a rear side of the vehicle 12. When the vehicle operator then shifts the transmission system 84 into the drive mode, the camera rotates to a position sufficient to record the video data at a location other than the rear side of the vehicle 12. It is to be understood that the camera may continuously rotate while the vehicle 12 is in drive mode, or it may rotate in response to a signal from the telematics unit 14 instructing it to rotate. The camera may also be configured to adjust its focus for recording video data that is near (also referred to as near-field focus) to recording video data that is far (also referred to as far-field focus), and visa versa. In other instances, the method uses more than one video recording device 90 to record the video data related to an event. In such instances, one of the devices 90 may be a reverse parking aid camera and the other device(s) 90 may be surveillance cameras. The surveillance cameras may be configured to i) rotate, from a default position, in response to an instruction signal sent from the telematics unit 14, or ii) substantially continuously scan the interior and/or other exterior portions of the vehicle 12.

Figure 2:
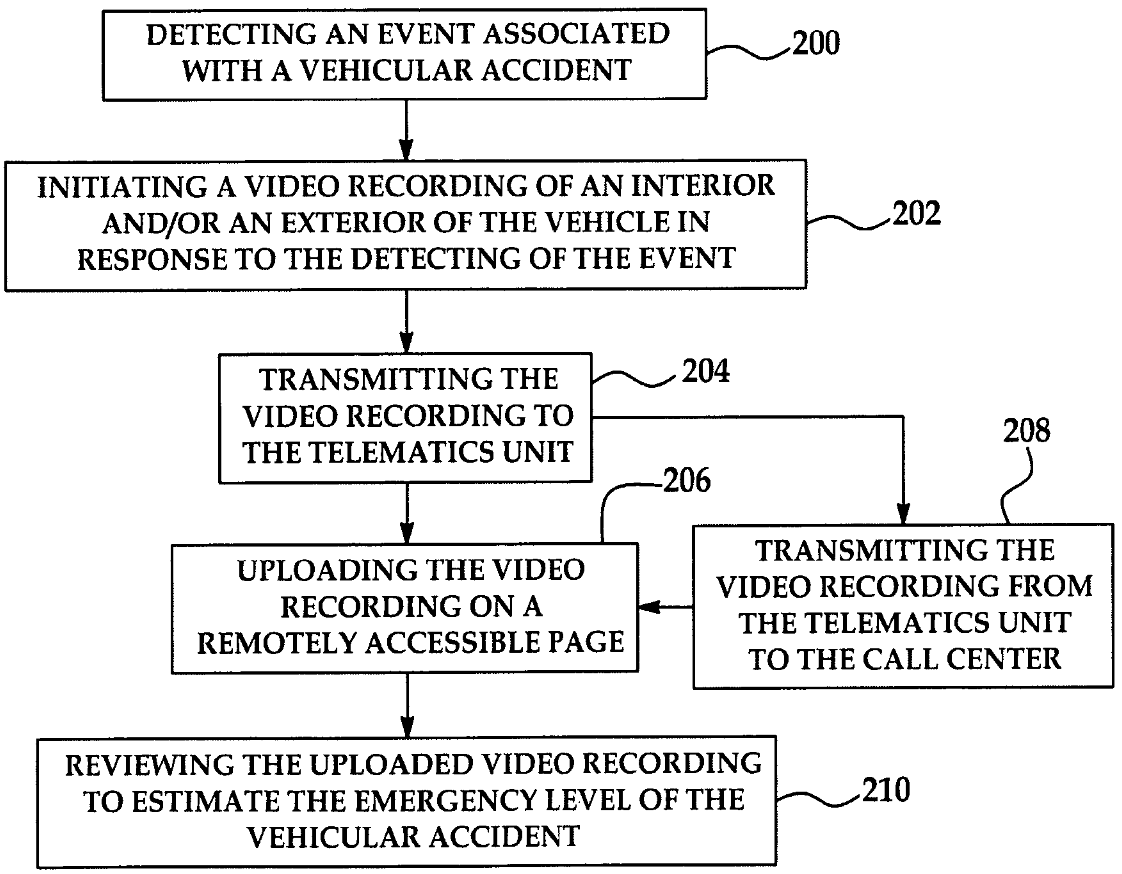
FIG. 2 is a flow diagram depicting a method for estimating an emergency level of a vehicular accident.

Referring now to FIG. 2, the method includes detecting an event indicative of or associated with the vehicular accident (as shown by reference numeral 200). In an example, the detecting may be accomplished by sensing, for example, a vehicle impact, a sudden deceleration of speed, or other similar occurrence via the sensor(s) 54. Upon sensing the event, the sensors(s) 54 transmit a signal to the telematics unit 14 notifying the telematics unit 14 that such an event has occurred. In another example, the detecting may be accomplished by observing the event by the vehicle operator or another vehicle occupant. Observing may be accomplished by seeing the event, hearing the event, feeling vibrations in the vehicle 12 as a result of an event, and/or the like. Upon making such an observation, the vehicle operator or other occupant notifies the telematics unit 14 that the event has occurred. In this example, notifying includes, e.g., actuating an emergency call button operatively associated with the telematics unit 14 or reciting a verbal utterance into the microphone 28 such as "Accident!", or other similar utterance.

It is to be understood that the detecting of the event may be accomplished prior to the vehicular accident or during the vehicle accident. For example, the sensors 54 may be configured to detect a sudden deceleration of the vehicle 12 (which often occurs prior to an actual vehicle impact) and, upon such detection, notifies the telematics unit 14 that an accident may be imminent. In another example, the sensors 54 may be configured to detect an actual vehicle impact and, upon such detection, notifies the telematics unit 14 that an accident is currently happening.

In response to the detection of the event, the method further includes initiating a video recording of an interior and/or an exterior of the vehicle 12 (as shown by reference numeral 202). In an example, upon notifying the telematics unit 14 that an event has occurred, the telematics unit 14 transmits a signal, via the communication bus 34, to the video recording device(s) 90 instructing the video recording device(s) 90 to begin recording video data. The video data generally includes video footage of relevant areas of the interior and/or the exterior of the vehicle 12. Relevant areas of the vehicle 12 may include, for example, a location on the vehicle 12 where an impact has occurred, the internal cabin of the vehicle 12 showing one or more of the vehicle occupants, the area surrounding the vehicle 12 depicting the environment in which the vehicle 12 is currently located, and/or the like, and/or combinations thereof. It is to be understood that the relevant areas may change depending, at least in part, on the triggering event. As one example, if the triggering event is impact information received from a sensor 54, the relevant area may be the point of impact. As another example, if the triggering event is the depression of an in-vehicle emergency button, the relevant area may be the vehicle cabin.

It is to be further understood that the video footage of the relevant areas of the interior and/or the exterior of the vehicle 12 may be obtained by rotating the video recording device(s) 90 upon detecting the event. The telematics unit 14 may be configured to identify the location of the sensor 54 transmitting the signal indicating that an event has occurred. For example, if the vehicle impact occurs proximate the driver's side door, the sensor 54 closest to the driver's side door transmits a signal to the telematics unit 14 indicating that the impact occurred. Upon receiving the signal from the sensor 54, the telematics unit 14 is notified of i) the fact that an impact occurred, and ii) where, on the vehicle 12, the impact occurred based on the location of the sensor 54 transmitting the signal. The telematics unit 14, in turn, transmits a signal to the video recording device(s) 90 instructing at least one of the video recording device(s) 90 to adjust its recording position to capture video footage of the interior and/or the exterior of the vehicle 12 proximate to the location of the impact. In instances where several recording devices 90 are used, the telematics unit 14 may instruct one of the video recording devices 90 to adjust its recording position to capture video footage proximate to the location of the impact, and instruct the other recording device(s) 90 to capture video footage of other locations inside and/or outside of the vehicle 12. In instances where a single video recording device 90 is used, the telematics unit 14 may instruct the video recording device 90 to record some video data proximate to the location of the impact, and then to scan other areas inside and/or outside of the vehicle 12 to capture additional video data that may be relevant for making the emergency level assessment. It is to be understood that the video recording device(s) 90 are changeable or adjustable from a default position. Accordingly, after adjusting the position of video recording device(s) 90 based on the instruction from the telematics unit 14, the video recording device(s) 90 are configured to adjust or change back to their original default positions.

In an example, the video recording device 90 may be configured to record video data prior to detecting an event. The video recording device 90 may, for example, begin recording the video data as soon as the vehicle operator shifts the transmission system 84 into the drive mode. In this example, the recording of the video data may be accomplished for a prescribed amount of time, and if an event is not detected within that prescribed amount of time, the video recording device 90 may be configured to record over the video data for another prescribed amount of time. In some instances, the prescribed amount of time includes the duration of operating the vehicle 12 (for example, the time between which the vehicle operator i) shifts the transmission system 84 into the drive mode, and ii) shifts the transmission system 84 into the park mode). It is to be understood that, in such instances, the prescribed amount of time may differ from one vehicle operation to another. In other instances, the prescribed amount of time may be a pre-established time interval, where the video recording device 90 periodically records over the video data so long as an event has not been detected. For example, the video recording device 90 may be operatively associated with the real time clock 46 and uses the real time clock 46 to determine the time at which the video recording device 90 should record over the video data based on the pre-established time interval. The video recording device 90 may, for example, record over the previously recorded video data every hour on the hour. It is to be understood that if an event is detected, the periodic overriding of the video data may be overridden on command from the telematics unit 14 and such video data is saved and/or ultimately uploaded to the remotely accessible page 94.

The video data recorded by the one or more video recording devices 90 is transmitted to the telematics unit 14 (as shown by reference numeral 204). The telematics unit 14 may, in one example, upload a video recording including the video data to the remotely accessible page 94 (as shown by reference numeral 206). In instances where a single recording device 90 is used to record the video data, the telematics unit 14 uploads the video recording in the form of a single-frame recording. In instances where more than one video recording device 90 is used, the respective video recordings may be uploaded, for example, as separate video recordings. In another example, the telematics unit 14 may be configured to compile the respective video recordings into a single multi-frame video recording, and the multi-frame video recording may be uploaded, by the telematics unit 14, to the remotely accessible page 94.

Rather than uploading the video recording, in another example, the telematics unit 14 may be configured to transmit the video recording(s) to the call center 24 (as shown by reference numeral 208), and then the call center 24 may upload the video recording(s) to the remotely accessible page 94 (again shown by reference numeral 206). As similarly described above with respect to the telematics unit 14, in instances where a single recording device 90 is utilized, the call center 24 uploads the video recording to the page 94 in the form of a single-frame recording. In instances where more than one video recording device 90 is utilized, the respective video recordings may be uploaded by the call center 24 to the page 94, for example, as separate video recordings. In still another example, the call center 24 may compile the respective video recordings into one multi-frame video recording, and the multi-frame video recording may be uploaded, by the call center 24, to the remotely accessible page 94.

In addition to uploading the video recording(s), in some instances, signature data related to the vehicular accident may also be uploaded to the remotely accessible page 94. As used herein, "signature data" refers to data obtained by the sensor(s) 54. Such data may relate to, e.g., the number and points of vehicle impact, the deceleration of the vehicle 12 (i.e., the change in velocity), the yaw rate (i.e., a lateral movement of the vehicle 12 about a vertical axis), and/or the like. The data may be used by emergency personnel to assess the severity of and/or the type of vehicular accident that has occurred. In an example, if the data includes information indicative of several vehicle impacts, then the emergency personal may estimate that the accident is a rollover accident. The signature data may be written to the video recording via, e.g., encoding the signature data on the video recording or, in instances where recording device 90 records the video on tracks or channels, the signature data may be encoded on the track or channel. In another example, the signature data may be uploaded separately from the video recording.

After the video recording (and the signature data, in instances where the signature data is available) has been uploaded to the remotely accessible page 94, the emergency personnel are notified of the uploaded video recording (and, in some instances, the signature data). Notifying the emergency personnel may be accomplished, for example, by transmitting a call signal to the emergency personnel from the telematics unit 14 (e.g., in instances where the telematics unit 14 uploaded the video recording) or from the call center 24 (e.g., in instances where the call center 24 uploaded the video recording). In an example, the notification may include therewith a case identification code.

After the emergency personnel have been notified, the method further includes reviewing the uploaded video recording to estimate the emergency level of the vehicular accident (as shown by reference numeral 210). Reviewing the uploaded video recording may be accomplished by a member of the emergency personnel. Such member may gain access to the uploaded video recording by accessing the remotely accessible page 94 (via, e.g., a personal computer or other device capable of accessing the Internet) and entering the case identification code and a password. In an example, the case identification code is transmitted to the emergency personnel via the telematics unit 14 and/or via the call center 24. The password may be used to verify that the emergency personnel member attempting the access the uploaded video recording is authorized to review the video. If the case identification code and the password are entered correctly, the emergency personnel member is allowed to review the uploaded video recording. In instances where the at least one of the identification code or the password are incorrect, the emergency personnel member attempting to access the video recording will not be allowed to review it.

Upon reviewing the uploaded video recording (and the signature data, if any is available), the emergency personnel member retrieves information from the video recording (and the signature data) including at least one of i) one or multiple injuries to one or more occupants of the vehicle, ii) a number of occupants in the vehicle, iii) an approximate age of each of the one or more occupants in the vehicle, or iv) an impact to the vehicle. Generally, such information is retrieved by the member viewing and analyzing the video. Based on the retrieved informed, the emergency personnel member assesses the emergency level of the vehicular accident and determines an appropriate rescue plan. In an example, the rescue plan may include a protocol for providing medical assistance to each injured/potentially injured occupant, a list of medical equipment needed to provide the medical assistance, a list of a number of on-site emergency medics or helpers needed to provide assistance, and/or the like, and/or combinations thereof.

While several examples have been described in detail, it will be apparent to those skilled in the art that the disclosed examples may be modified. Therefore, the foregoing description is to be considered exemplary rather than limiting.

The invention claimed is:

1. A method of estimating an emergency level of a vehicular accident, the method comprising:
- detecting an event associated with the vehicular accident;
- via a telematics unit operatively connected to a vehicle, initiating a video recording of at least one of an interior of the vehicle or an exterior of the vehicle in response to the detecting of the event;
- via the telematics unit, uploading the video recording on a remotely accessible page; and
- reviewing the uploaded video recording to estimate the emergency level of the vehicular accident.

2. The method as defined in claim 1 wherein prior to the uploading of the video recording, the method further comprises transmitting, via the telematics unit operatively connected to the vehicle, at least the video recording to a call center.

3. The method as defined in claim 2, further comprising uploading signature data related to the vehicular accident.

4. The method as defined in claim 1 wherein the video recording of the at least one of the interior of the vehicle or the exterior of the vehicle is generated using at least one video recording device operatively associated with the vehicle.

5. The method as defined in claim 4 wherein the at least one video recording device is a reverse parking aid camera operatively disposed in or on the vehicle.

6. The method as defined in claim 5 wherein the reverse parking aid camera is positioned to record video data located at a rear side of the vehicle, and wherein prior to the detecting of the event, the method further comprises:
- shifting the vehicle into drive mode; and
- rotating the reverse parking aid camera to a position sufficient to record video data at a location other than the rear side of the vehicle.

7. The method as defined in claim 1 wherein the detecting of the event associated with the vehicular accident is accomplished prior to the vehicular accident or during the vehicular accident.

8. The method as defined in claim 1 wherein after the uploading of the video recording, the method further comprises notifying emergency personnel of the uploaded video recording, the notifying being accomplished by transmitting a call signal to the emergency personnel.

9. A method of estimating an emergency level of a vehicular accident, the method comprising:
- detecting an event associated with the vehicular accident;
- initiating a video recording of at least one of an interior of a vehicle or an exterior of the vehicle in response to the detecting of the event;
- uploading the video recording on a remotely accessible page;
- notifying emergency personnel of the uploaded video recording; and
- reviewing the uploaded video recording to estimate the emergency level of the vehicular accident, the reviewing being accomplished by:
  - accessing, by the emergency personnel, the remotely accessible page;
  - entering a case identification code and a password; and
  - if the case identification code and the password are entered correctly, allowing the emergency personnel to review the uploaded video recording.

10. The method as defined in claim 9, further comprising retrieving data from the uploaded video recording, the data including at least one of i) an injury to one or more occupants of the vehicle, ii) a number of occupants in the vehicle, iii) an approximate age of each of the one or more occupants in the vehicle, or iv) an impact to the vehicle.

11. The method as defined in claim 10, further comprising determining an appropriate rescue plan based on the retrieved data.

12. A system for estimating an emergency level of a vehicular accident, comprising:
- at least one sensor disposed at least one of in or on a vehicle, the at least one sensor configured to detect an event associated with the vehicular accident;
- a video recording device operatively connected to the vehicle, the video recording device configured to produce a video recording of at least one of an interior of a vehicle or an exterior of the vehicle in response to detecting the event via the at least one sensor;
- a telematics unit operatively connected to the vehicle and configured to transmit the video recording to a call center; and
- a remotely accessible page configured to have the video recording uploaded thereto from the call center, the uploaded video recording being reviewable by emergency personnel.

13. The system as defined in claim 12 wherein the video recording device is a reverse parking aid camera operatively disposed in or on the vehicle.

14. The system as defined in claim 13 wherein the vehicle includes an automatic transmission system controlled by a gearshift, and wherein the reverse aid parking camera is configured to rotate to a position sufficient to record video data at a location other than the rear side of the vehicle when the gearshift is shifted into a drive mode.

15. The system as defined in claim 12, further comprising means for notifying the emergency personnel of the uploaded video recording.

16. The system as defined in claim 12 wherein video recording includes data selected from i) an injury to one or more occupants of the vehicle, ii) a number of occupants in the vehicle, iii) an approximate age of each of the one or more occupants in the vehicle, and iv) an impact to the vehicle.

17. The system as defined in claim 12, further comprising at least one other video recording device operatively connected to the vehicle, and wherein:
- the video recording device is further configured to produce a video recording of a predetermined portion of the at least one of the interior of a vehicle or the exterior of the vehicle in response to the detecting of the event; and
- the at least one other video recording device configured to produce an other video recording of an other predetermined portion of the at least one of the interior or the exterior of the vehicle in response to the detecting of the event.

18. The system as defined in claim 17, further comprising a multi-frame video including at least a portion of the video recording from the video recording device and at least a portion of the other video recording from the at least one other video recording device.

19. The system as defined in claim 17 wherein a position of the at least one of the video recording device or the at least one other video recording device is changeable from a default position.

* * * * *